United States Patent
Hanna et al.

(10) Patent No.: US 7,554,927 B2
(45) Date of Patent: Jun. 30, 2009

(54) NETWORK ENTITY FOR INTERCONNECTING SIP END-POINTS OF DIFFERENT CAPABILITIES

(75) Inventors: Thomas Hanna, Detmold (DE);
Klaus-Josef Kunte, Borchen (DE); Jörg Littmann, Delbrück (DE); Ingolf Thiele, Erwitte (DE)

(73) Assignee: Siemes Aktiengesellschaft, Munich (DE)

( * ) Notice: Subject to any disclaimer, the term of this patent is extended or adjusted under 35 U.S.C. 154(b) by 449 days.

(21) Appl. No.: 10/573,675

(22) PCT Filed: Sep. 7, 2004

(86) PCT No.: PCT/EP2004/010021

§ 371 (c)(1),
(2), (4) Date: Mar. 24, 2006

(87) PCT Pub. No.: WO2005/032090

PCT Pub. Date: Apr. 7, 2005

(65) Prior Publication Data

US 2007/0083658 A1    Apr. 12, 2007

(30) Foreign Application Priority Data

Sep. 29, 2003 (GB) ................. 0322738.6

(51) Int. Cl.
*H04L 12/16* (2006.01)
(52) U.S. Cl. .............. 370/252; 370/259; 370/277; 455/407; 455/414.1; 455/416; 709/227; 709/228

(58) Field of Classification Search ............. 370/260, 370/219, 352, 259, 261, 265, 271, 277, 310, 370/349, 389, 395.52, 410, 252; 709/227, 709/228, 203, 209; 455/415, 416, 412.2, 455/414.1, 417, 425, 436, 461, 407
See application file for complete search history.

(56) References Cited

U.S. PATENT DOCUMENTS 5,859,979 A * 1/1999 Tung et al. ............... 709/228

(Continued)

FOREIGN PATENT DOCUMENTS

EP    1 179 941 A2    2/2002

(Continued)

OTHER PUBLICATIONS

"Request for Comments RFC.3261 SIP: Session Initiation Protocol"; The Internet Society, Copyright Jun. 2002; J. Rosenberg et al.*

(Continued)

*Primary Examiner*—Hassan Kizou
*Assistant Examiner*—Benjamin Elliott

(57) ABSTRACT

There is described a Session Initiation Protocol (SIP) network entity for operating in a communications channel between a first SIP end point and a second SIP end point in a communication network. The first SIP end point has available a first set of communication features and the second SIP end point has available a second set of communication features, including at least one communication feature, for example Music on Hold, that is unavailable to the first SIP end point. The network entity acts as a client application for the first SIP end point and as a server application for the second SIP end point and is arranged to exchange signaling information with the SIP end points to enable the second SIP end point to utilize the at least one communication feature during communications with the first SIP end point.

9 Claims, 2 Drawing Sheets

U.S. PATENT DOCUMENTS

| | | | | |
|---|---|---|---|---|
| 5,933,784 | A * | 8/1999 | Gallagher et al. | 455/552.1 |
| 6,498,791 | B2 * | 12/2002 | Pickett et al. | 370/353 |
| 6,742,042 | B1 | 5/2004 | Holden et al. | 709/230 |
| 6,785,374 | B2 * | 8/2004 | Wang et al. | 379/219 |
| 6,985,961 | B1 | 1/2006 | Ramsayer et al. | 709/238 |
| 6,987,756 | B1 * | 1/2006 | Ravindranath et al. | 370/352 |
| 7,002,912 | B2 * | 2/2006 | Wengrovitz | 370/230 |
| 7,010,727 | B1 * | 3/2006 | Stucker | 714/52 |
| 7,120,139 | B1 * | 10/2006 | Kung et al. | 370/352 |
| 7,123,700 | B1 * | 10/2006 | Weaver et al. | 379/88.19 |
| 7,164,762 | B2 * | 1/2007 | Hanson et al. | 379/212.01 |
| 7,366,780 | B2 * | 4/2008 | Keller et al. | 709/227 |
| 2002/0191595 | A1 * | 12/2002 | Mar et al. | 370/352 |
| 2003/0018677 | A1 * | 1/2003 | Mathur et al. | 708/550 |
| 2003/0035528 | A1 * | 2/2003 | Baker | 379/207.04 |
| 2004/0062375 | A1 * | 4/2004 | Wang et al. | 379/219 |
| 2004/0078427 | A1 * | 4/2004 | Gil et al. | 709/203 |
| 2004/0139088 | A1 * | 7/2004 | Mandato et al. | 707/100 |
| 2005/0060411 | A1 * | 3/2005 | Coulombe et al. | 709/227 |
| 2005/0074111 | A1 * | 4/2005 | Hanson et al. | 379/212.01 |
| 2005/0075102 | A1 * | 4/2005 | Minko | 455/420 |

FOREIGN PATENT DOCUMENTS

EP          1 331 785 A1    7/2003

OTHER PUBLICATIONS

J. Lennox, J. Rosenberg, H. Schulzrinne, "Common Gateway Interface for SIP", Internet Engineering Task Force, Mar. 1, 2000, pp. 1-27, XP001012352.

J. Rosenberg and H. Schulzrinne, "SIP For Presence", Internet Engineering Task Force, Nov. 13, 1998, pp. 1-18, XP002173451.

* cited by examiner

NETWORK ENTITY FOR INTERCONNECTING SIP END-POINTS OF DIFFERENT CAPABILITIES

CROSS REFERENCE TO RELATED APPLICATIONS

This application is the US National Stage of International Application No. PCT/EP2004/010021, filed Sep. 7, 2004 and claims the benefit thereof. The International Application claims the benefits of Great British Patent application No. 0322738.6 filed Sep. 29, 2003, all of the applications are incorporated by reference herein in their entirety.

FIELD OF THE INVENTION

This invention relates to a network entity. In particular, but not exclusively, the invention relates to a Session Initiation Protocol (SIP) network entity.

BACKGROUND OF THE INVENTION

The session initiation protocol (SIP), which is described in RFC 3261, is a signalling protocol for setting up, managing and tearing down of voice, video and other multi-media sessions in packet based networks. SIP is designed simply to handle these aspects of communication, other protocols such as Real Time Protocol (RTP) are used for actual data transport. SIP is an application layer protocol that can run over other protocols such as User Datagram Protocol (UDP) and Transmission Control Protocol (TCP).

A SIP network is typically composed of four types of logical SIP entities, namely, User Agents (UA), Proxy Servers, Redirect Servers and Registrars.

User Agents (UA) are endpoint entities that initiate and terminate SIP sessions by exchanging requests and responses. A UA contains a User Agent Client (UAC) and a User Agent Server (UAS). A UAC is a client application that initiates SIP requests. A UAS is a server application that contacts a user when a SIP request is received and that returns a response on behalf of the user. Typical devices that have a UA function in a SIP network include PCs, IP telephones and automated answering services.

A proxy server is an intermediary entity that acts as both a server and a client for making requests on behalf of other clients. Requests are serviced either internally or by passing them on to other servers. A proxy server may receive requests and forwards them to another server (called a next-hop server), which has more precise location information about the callee. The next-hop server might be another proxy server, a UAS, or a redirect server.

A redirect server is a server that accepts a SIP request, maps the SIP address of the called party into a new address and returns it to its client, typically a proxy server. Registration servers are continually kept updated on the current locations of users.

The primary function of proxy and redirect servers is call routing, the determination of the set of servers to traverse in order to complete the call. A proxy or redirect server can use any means at its disposal to determine the 'next-hop' server, including executing programs and consulting databases.

The SIP protocol is a text-based protocol partly modelled on HTTP. There are two types of SIP messages, namely, requests, which are sent from clients to servers and response, which are sent from servers to clients. A request and the responses that follow it are known as a SIP transaction.

Request methods defined in the protocol include; 'INVITE' which is used to initiate a session or change session parameters, 'ACK' which is used to confirm that a session has been initiated and 'BYE' which is used to terminate a session.

Response messages contain numeric response codes and there are two types of responses and six classes. 'Provisional (1xx class)' responses are used by a server to indicate progress of SIP transactions. An example of a provisional response is the response code 180 'Ringing' response. 'Final (2xx, 3xx, 4xx, 5xx, 6xx classes)' responses are used to terminate SIP transactions. An example of a final response is the response code 200 'OK' response.

A caller establishes a call by issuing an 'INVITE' request. This request contains header fields used to convey information about the call. The most important header fields are 'To' and 'From', which contain the callee's and caller's SIP address, respectively. The Subject header field identifies the subject of the call.

If the callee accepts the call, it responds with an 'OK' response. Connection is done using a three way handshake and so the caller responds with an 'ACK' message to confirm receipt of the 'OK' response.

SIP provides for a variety of multi-media communication features similar to those provided by traditional Private Branch Exchanges, for example, call waiting, call hold, Music on Hold, and conference calling. It is envisaged that many new such features for client endpoint-to-endpoint communication in SIP networks will be developed. Communication will sometimes occur in circumstances where one of the endpoints provides a new feature that the other endpoint does not. To date, if there is a difference in the set of features available at one endpoint in a SIP network and the set of features available at the other endpoint in the network, the endpoints communicate using their lowest common feature set.

SUMMARY OF THE INVENTION

The present invention aims to solve the problem of connecting an endpoint having an enhanced communication feature set and an endpoint having a basic communication feature set in a manner that allows the enhanced feature set to be used.

According to the invention there is provided a network entity for operating in a communications channel between a first end point and a second end point in a packet based communications network, the first end point having available a first set of communication features and the second end point having available a second set of communication features, including at least one communication feature unavailable to the first end point, the network entity comprising means for acting as a client application for the first end point and as a server application for the second end point and arranged to exchange signalling information with the end points to enable the second end point to utilise the at least one communication feature during communications with the first end point.

BRIEF DESCRIPTION OF THE DRAWINGS

An embodiment of the invention will now be described with reference to the accompanying drawings in which.

DETAILED DESCRIPTION OF THE INVENTION

Figure 1:
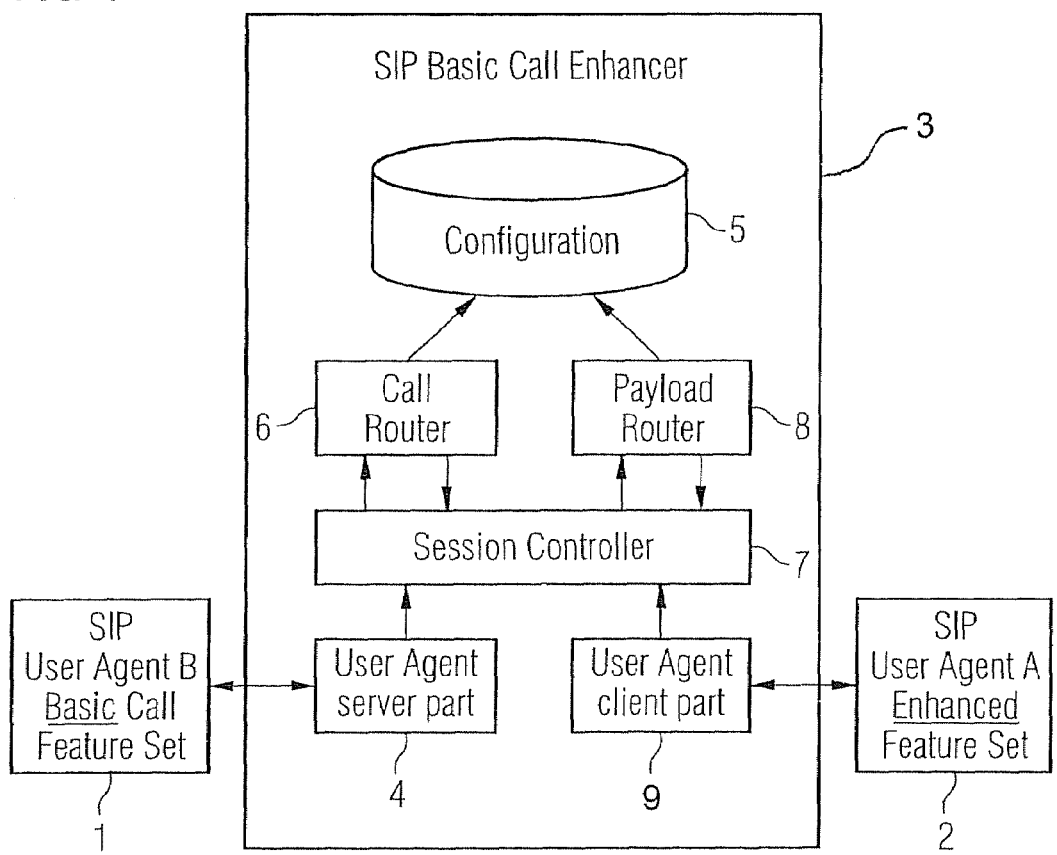
FIG. 1 illustrates a system embodying the invention.

FIG. 1 illustrates schematically a system embodying the present invention. The system comprises a first SIP user agent 1, a second SIP user agent 2, and a SIP basic call enhancer 3.

The first SIP user agent 1 and the second SIP agent 2 may both for example be IP telephones. In this embodiment, the first SIP user agent 1 provides only a basic SIP functionality while SIP user agent 2 provides a more advanced SIP functionality. By basic SIP functionality, it is meant that the first SIP user agent 1 supports only session initiation and termination but does not support session modification. The second SIP user agent 2 does support session modification and provides an enhanced set of telephony features, including for example, call transfer, conference, call hold, Music on Hold (MOH), which are not provided by the first SIP user agent 1.

The SIP basic call enhancer (BCE) 3, is an object located within the communication channel between the first 1 and second 2 SIP user agents. The functionality of the BCE may be provided by a suitably configured Server device located in the SIP network between the first 1 and second 2 SIP user agents.

In operation, during communication between the first 1 and second 2 SIP user agents, the BCE 3 communicates concurrently with both user agents by acting as a SIP server for the first SIP user agent 1 and as a SIP client for the second SIP user agent 2. In doing so, the BCE 3 processes and manages a flow of SIP messages that enable the first 1 and second SIP user agents 2 to utilise the extra telephony features supported by the second SIP user agent 2 and which normally could not be used in a session between the two user agents.

The BCE 3 comprises a user agent server part 4 for exchanging messages with the first SIP user agent 1 and a user agent client part 9 for exchanging messages with the second SIP user agent 2. These components are standard SIP components as defined in RFC 3261.

The BCE 3 further comprises a local configuration store 5 for storing information required for the BCE to be able to route messages. This information comprises SIP URI address, e.g. the TCP/IP addresses and port numbers and the Media-Stream address e.g. UDP address and port numbers.

A call router 6 provides the intelligence needed to involve the first 1 and second 2 user agents in enhanced SIP sessions.

The call router 6 receives session request messages from the user agent server part 4 and in response generates an appropriate session request message for the user agent client part 9.

The call router 6 uses information contained in the store 5 to substitute SIP URI and Media Stream addresses in the request messages received from the user agent client part 9 with appropriate new addresses in the messages passed to the user agent client part 9 for transmission onwards in the network.

Furthermore, the call router 6 generates its own request messages for the second user agent 2 side of the network and interprets event messages received from this side of the network.

All messages sent from the user agent server part 4 to the call router 6 and from the call router 6 to the user agent part 9 pass via a session controller 7. The session controller 7 thus interacts with the call router 6 on one side and with the user agent server part and the user agent client part on the other side, to keep track of session states and progress. Therefore the session controller 7 behaves like a state machine automat, acting on the user agent session states and routing messages.

A payload router 8 is needed because the SIP protocol specifies the endpoints for a media stream. The first user agent 1 can only handle a single media stream session to the BCE 3 and cannot change media stream capabilities within a session. In other words, the first user agent 1, as a basic SIP client, cannot handle multiple media streams within a SIP session. The second user agent 2 can handle multiple media streams within a SIP session (i.e. Re-invite) because this user agent supports an enhanced feature set. The main task of the payload router 8 is to manage any media streams in such away that the BCE 3 acts as a virtual end point to both the first 1 and second 2 user agents in respect of these media streams.

Figure 2:
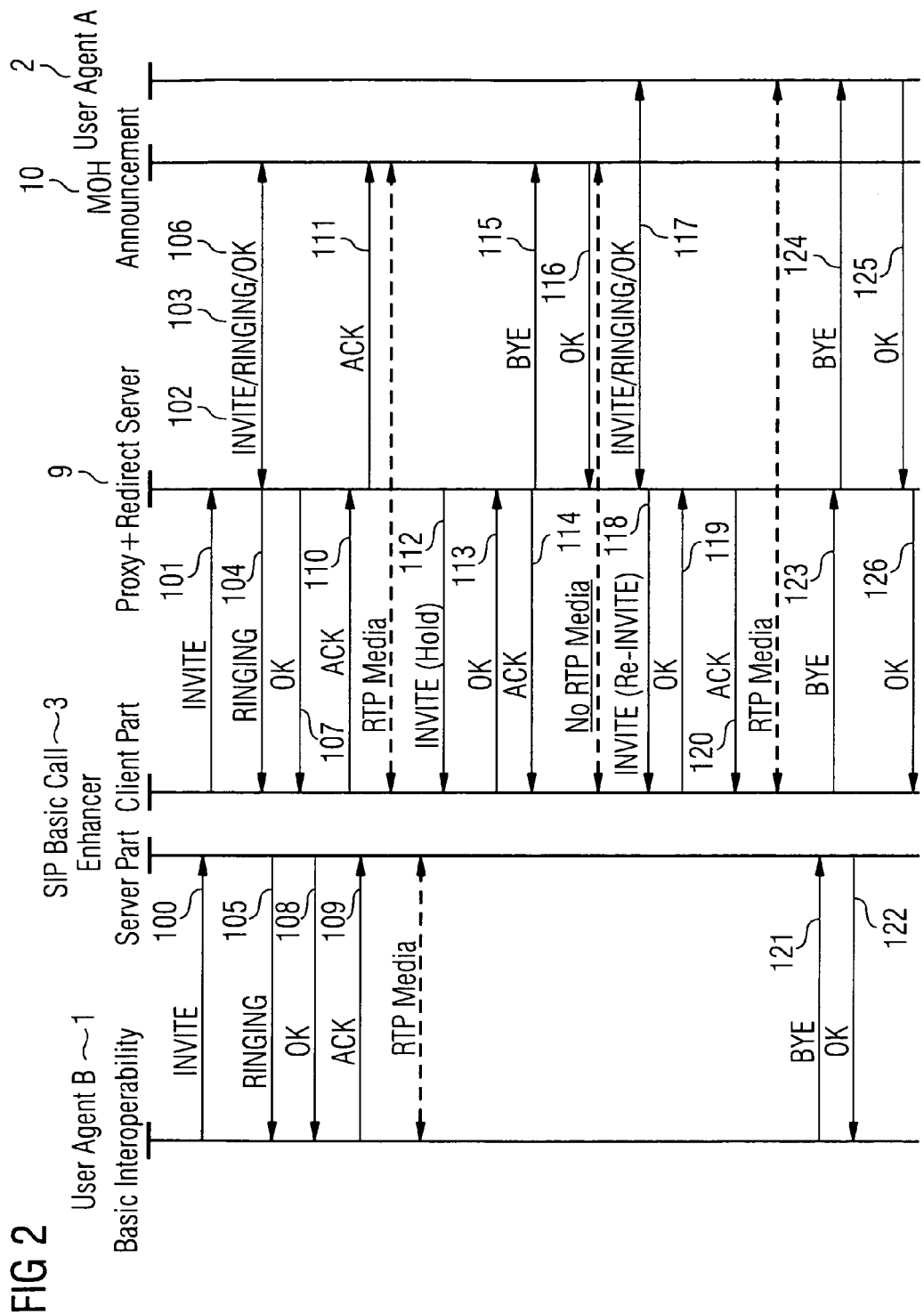
FIG. 2 illustrates a message sequence chart

Referring now to FIG. 2 of the accompanying drawings there is illustrated a message sequence chart.

In the sequence illustrated in FIG. 2, the first user agent 1, the agent having the basic SIP functionality, calls the second user agent 2, the agent having the enhanced SIP functionality. The second user agent 2 is busy on another call and is initially unable to accept the first agent's call. One telephony feature available to the second user agent 2 but not to the first user agent 1 is the well known Music on Hold (MOH) feature.

The BCE 3 co-ordinates with the SIP network the connection of the first user agent 1 to a MOH entity and the subsequent connection of the first 1 and second 2 agents when the second agent is ready to receive the first agents call 1.

Referring now to FIG. 2 in more detail, at step 100, the first user agent 1 transmits an INVITE message to the second user agent 2. In accordance with standard SIP procedure, the Invite message is routed through a sequence of 'next hop' proxy servers (not shown) each server in the sequence having more precise information on the location of the second user agent 2 than the server before it. The final server in this sequence (not shown) is configured to redirect incoming Invite messages for the second user agent 2 to the BCE 3. The Invite message thus arrives at the Server Part of the BCE 3. The redirection of the message may be indicated to the first user agent 1 by the SIP network using standard SIP mechanisms.

The user agent server part of the BCE 3 receives the Invite message and forwards it to the session controller 7. The session controller 7 handles the session state (e.g. state=initiated).

The Invite message is passed to the call router 6 which fits URI address information in the SIP message header and the Media-Stream addresses in the SDP protocol parameters within the standard SIP message body.

The message is passed to the user agent client part of the BCE 3 which transmits the message onwards in the network, step 101, to a SIP proxy/redirect server 9.

The SIP proxy server 9 is aware that the second user agent 2 is busy and so redirects the message, step 102, to a Music on Hold (MOH) feature 10. The server 9 may be kept aware of the session status of the second user agent 2 by a SIP presence service. Alternatively, the server 9 may be a so called stateful proxy server that is able to derive the session status of the second user agent 2 by virtue of the protocol flow between the two.

The MOH feature 10 is a SIP invocable feature that provides call announcements and music to a caller that has been placed on hold.

The MOH 10 responds to the server 9 by transmitting a Ringing reply, step 103, which the server 9 in turns routes to the client part of the BCE 3, step 104 and which is routed from the server part of the BCE 3 to the first user agent 1, step 105.

Likewise, an OK message is transmitted from the MOH 10 to the sever 9, step 106, which the server 9 in turns routes to the client part of the BCE 3, step 107 and which is routed from the server part of the BCE 3 to the first user agent 1, step 108.

The first user agent 1 responds by transmitting an Ack message which is received at the server part of the BCE 3, step 109, and in turn, an ACK message is routed from the client part of the BCE 3 to the server 9, step 110, and from the server 9 to the MOH 10, step 111.

This exchange of messages sets up a Real Time Protocol (RTP) media flow between the MOH 10 and the payload router 8 of the BCE 3, and another RTP media flow between the payload router 8 and the first user agent 1. This enables hold announcements and music to be delivered from the MOH 8 to the first user agent 1.

When the existing session of the second user agent 2 ends, the server 9 is informed and in turn, informs the BCE 3 by transmitting an Invite (HOLD) message, step 112, to initiate a termination of the MOH session. The BCE 3 responds with an OK message, step 113, prompting an ACK message from the server 9, step 114.

To terminate the RTP connection between the BCE 3 and the MOH 10, the server 9 sends a BYE message to the MOH 10, step 115, which responds with an OK message, step 116.

At this point, the SIP connection between the BCE 3 and the MOH 10 is terminated and thus the first user agent 1 no longer receives a MOH media stream, but the SIP connection between the first user agent 1 and the BCE remains in place.

The server 9 now establishes a connection between the second user agent 2 and the BCE 3. To this end, the server 9 sends an Invite message to the second user agent 2, step 117, prompting an exchange of a Ringing, an 'OK' and an ACK message between the two (for brevity all these messages are illustrated as a single step 117).

Furthermore, the server 9 sends an Invite (Re-invite) message to the BCE, step 118, which replies with an OK message, step 119, prompting an ACK message from the server 9, step 120.

At this point, if the second user agent 2 goes off hook, the BCE's 3 payload router connects the RTP channels between the first user agent 1 and the second user agent 2 allowing them to communicate.

In this scenario, the first user agent 1 initiates termination of the session by transmitting a BYE message to the BCE 3, step 121, which responds with an OK message, step 122. This terminates the SIP session between the BCE 3 and the first user agent 1.

The BCE 3 transmits a BYE message via the server 9, step 123, to the second user agent 2, step 124. The second user agent 2 responds with an OK message transmitted via the server 9, step 125, to the BCE step 126. This terminates the SIP session between the BCE 3 and the second user agent 2.

Having thus described the present invention by reference to a preferred embodiment, it is to be well understood that the embodiment in question is exemplary only and that modifications and variations such as will occur to those possessed of appropriate knowledge and skills may be made without departure from the scope of the invention as set forth in the appended claims.

The invention claimed is:

1. A method for operating a Session Initiation Protocol (SIP) network entity in a communication channel between a first SIP user agent and a second SIP user agent in a packet based communication network with available a first set of communication features supported by the first SIP user agent and available a second set of communication features supported by the second SIP user agent, including at least one communication feature in the second set of communication features which is not supported by the first SIP user agent, comprising:
   acting as a client application for the first SIP user agent and as a server application for the second SIP user agent; and
   arranging to exchange signaling information with the first and second user agents to enable the second SIP user agent to utilize the at least one communication feature which is unsupported by the first SIP user agent during communications with the first SIP user agent.

2. The method as claimed in claim 1, wherein a call routing addresses signaling information that is exchanged between the SIP network entity and the first and second SIP user agents or the SIP network entity and the communication network.

3. The method as claimed in claim 2, wherein a payload routing addresses payload data received at the SIP network entity for routing to the first or second SIP user agents.

4. A network entity for operating a Session Initiation Protocol (SIP) network in a communication channel between two end points in a packet based communication network, comprising:
   a first SIP user agent being a first end point and supporting a basic SIP communication feature set;
   a second SIP user agent being a second end point and supporting an enhanced SIP communication feature set; and
   a SIP Basic Call Enhancer located within the communication channel between the first and second SIP user agents that enables the second SIP user agent to utilize the enhanced SIP communication feature set which is unavailable to the first SIP user agent when communicating with the first SIP user agent.

5. The network entity as claimed in claim 4, wherein the basic SIP communication feature set supports session initiation and termination.

6. The network entity as claimed in claim 4, wherein the enhanced SIP communication feature set supports session initiation and termination, and an enhanced set of telephony features selected from the group consisting of: call waiting, call transfer, conference calling, call hold, and music on hold.

7. The network entity as claimed in claim 4, wherein the SIP Basic Call Enhancer comprises:
   a user agent server part that exchanges messages with the first SIP user agent,
   a user agent client part that exchanges messages with the second SIP user agent,
   a local configuration store that stores information required for the Basic Call Enhancer to route messages,
   a call router that involves the first and second SIP user agents in an enhanced SIP session,
   a session controller that transfers messages from the user agent server part to the call router and from the call router to the user agent client part to keep track of session states and progress, and
   a payload router that manages media streams so that the Basic Call Enhancer functions as a virtual end point to both the first and second SIP user agents in respect of the media streams.

8. The network entity as claimed in claim 4, wherein the SIP Basic Call Enhancer functions as a client application for the first end point.

9. The network entity as claimed in claim 4, wherein the SIP Basic Call Enhancer functions as a server application for the second endpoint.

* * * * *